(No Model.)

C. F. LYTLE.
REIN HOLDER.

No. 465,937. Patented Dec. 29, 1891.

Witnesses.
A. Ruppert.
G. B. Towles.

Inventor.
Charles F. Lytle
per
Thomas P. Simpson
atty

UNITED STATES PATENT OFFICE.

CHARLES FRANK LYTLE, OF SULPHUR SPRINGS, IOWA.

REIN-HOLDER.

SPECIFICATION forming part of Letters Patent No. 465,937, dated December 29, 1891.

Application filed April 13, 1891. Serial No. 388,678. (No model.)

*To all whom it may concern:*

Be it known that I, CHARLES FRANK LYTLE, a citizen of the United States, residing at Sulphur Springs, in the county of Buena Vista and State of Iowa, have invented certain new and useful Improvements in Rein-Holders; and I do hereby declare the following to be a full, clear, and exact description of the invention, such as will enable others skilled in the art to which it appertains to make use the same.

The special object of my invention is to make a device by which the lines of a two-horse team may be prevented from getting under the end of the tongue of any vehicle or implement to which the team may be attached.

Figure 1:
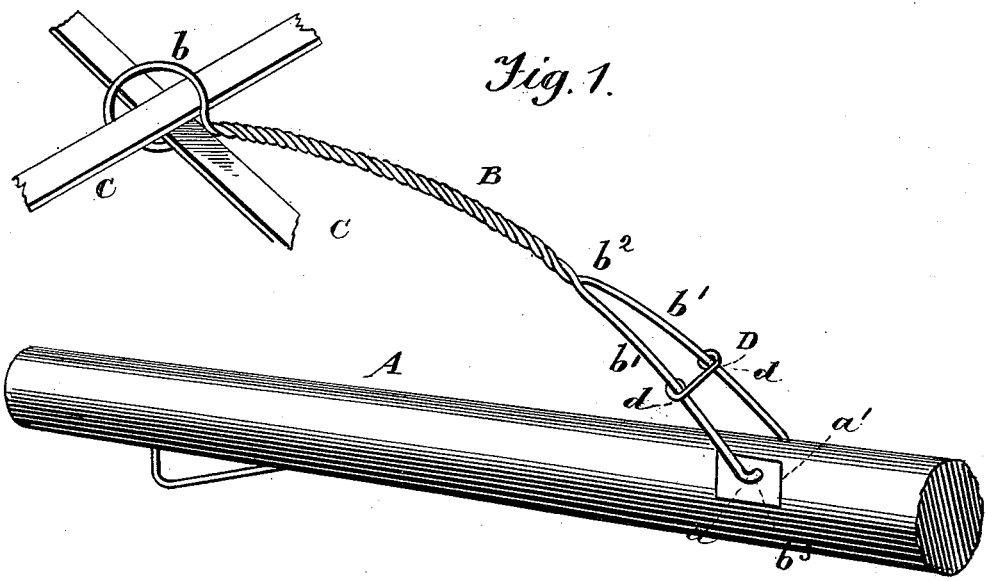
Figure 2:
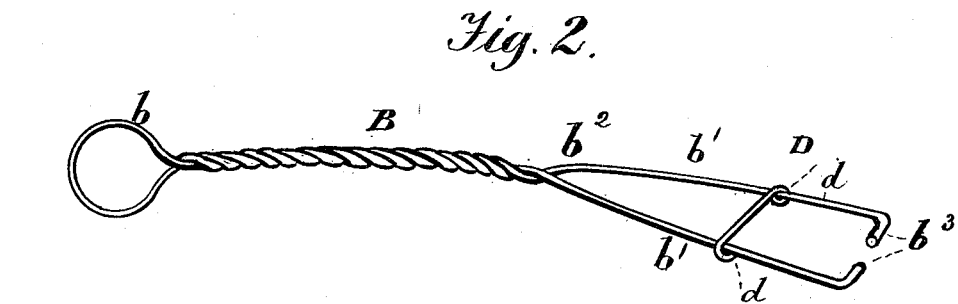
Figure 3:
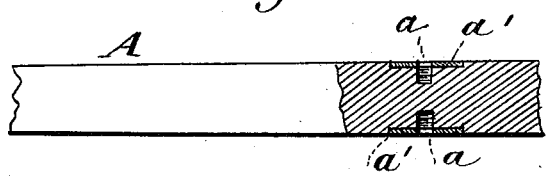

Figure 1 of the drawings is a perspective view of a vehicle tongue or pole such as is generally used with two horses, the rein-holder being attached thereto and the crossing reins carried through its loop. Fig. 2 is a detail view of the rein-holder when off the pole, and Fig. 3 a similar view of the front portion of a pole.

In the drawings, A represents the pole or tongue provided on each side and opposite to each other with the two bearings $a\ a$, which may each be re-enforced by a metallic plate $a'$.

B is the rein-holder, which is preferably formed of wire, doubled and twisted, to leave at the doubled end a loop $b$, sufficiently large to allow the crossing lines C C to pass easily therethrough. The arms $b'\ b'$ are then caused to diverge from the point $b^2$, and to have at the ends the trunnions $b^3\ b^3$, turned at right angles, or thereabout to the arms $b'$ and toward each other. By this construction each trunnion $b^3$ will enter one of the bearings $a$, both being held securely in the bearings by the slide-bar D, which has end eyes $d\ d$, movable on the arms $b'$. When the harness is to be taken off the horses, the slide-bar D is moved back on the arms $b'\ b'$, so that the trunnions $b^3\ b^3$ will cease to engage the bearings $a\ a$, and may be left on the harness when it is put away.

Having thus described all that is necessary to a full understanding of the invention, what I claim as new, and desire to protect by Letters Patent, is—

The rein-holder B, consisting of a doubled and twisted wire having the loop $b$ at one end, the arms $b'$ carrying trunnions $b^3\ b^3$, turned toward each other, and the slide-bar D, having the eyes $d\ d$ on said arms, whereby it may be used with a vehicle tongue or pole, as and for the purpose set forth.

In testimony whereof I affix my signature in presence of two witnesses.

CHARLES FRANK LYTLE.

Witnesses:
J. M. LYTLE,
F. E. PATTERSON.